(12) United States Patent
Nakamura et al.

(10) Patent No.: US 7,945,961 B2
(45) Date of Patent: May 17, 2011

(54) DISPLAY CONTROL DEVICE, IMAGE PROCESSING DEVICE AND DISPLAY CONTROL METHOD

(75) Inventors: Mahina Nakamura, Musashino (JP); Maki Sato, Yokohama (JP); Tsunehiro Motegi, Shinjuku-ku (JP); Yumiko Okuma, Nakano-ku (JP); Yasutsugu Sasaki, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1031 days.

(21) Appl. No.: 11/736,691

(22) Filed: Apr. 18, 2007

(65) Prior Publication Data

US 2007/0250936 A1 Oct. 25, 2007

(30) Foreign Application Priority Data

Apr. 21, 2006 (JP) ................................. 2006-117756

(51) Int. Cl.
*G06F 12/14* (2006.01)
(52) U.S. Cl. ........................................................ 726/27
(58) Field of Classification Search .............. 726/27–29; 713/166; 340/5.8
See application file for complete search history.

(56) References Cited

U.S. PATENT DOCUMENTS

| | | | | |
|---|---|---|---|---|
| 6,583,797 B1 * | 6/2003 | Roth | ............................. | 715/810 |
| 2004/0100505 A1 * | 5/2004 | Cazier | ........................... | 345/811 |
| 2004/0155974 A1 * | 8/2004 | Hong | ........................ | 348/333.02 |
| 2006/0048234 A1 * | 3/2006 | Imaizumi et al. | ................ | 726/27 |
| 2006/0064741 A1 * | 3/2006 | Terao | ................................. | 726/4 |
| 2006/0070070 A1 * | 3/2006 | Iwamoto et al. | .............. | 718/100 |
| 2006/0126100 A1 * | 6/2006 | Jung | ............................ | 358/1.14 |
| 2007/0247641 A1 | 10/2007 | Okuma et al. | | |
| 2007/0247642 A1 | 10/2007 | Nakamura et al. | | |
| 2007/0247643 A1 | 10/2007 | Nakamura et al. | | |
| 2007/0250785 A1 | 10/2007 | Nakamura et al. | | |
| 2007/0283293 A1 | 12/2007 | Nakamura et al. | | |

FOREIGN PATENT DOCUMENTS

| | | |
|---|---|---|
| JP | 11-288344 | 10/1999 |
| JP | 2000-231309 | 8/2000 |
| JP | 2004-185143 | 7/2004 |
| JP | 2004-348085 | 12/2004 |

* cited by examiner

*Primary Examiner* — Ellen Tran
(74) *Attorney, Agent, or Firm* — Turocy & Watson, LLP (57) ABSTRACT

There is disclosed a technique capable of improving operatability for registered users and capable of displaying an interface screen for guest users with security levels maintained. A display control device includes: an identification information obtaining unit that obtains identification information for identifying a user; a determination unit that determines, based on the identification information obtained by the identification information obtaining unit, whether the user belongs to a first group or a second group which is allowed to conduct operation concerning only processing items of a lower security level than a security level allowed for the first group; and a control unit that performs control so as to display, for the user determined as belonging to the second group by the determination unit, display objects corresponding to predetermined processing items of a lower security level than a security level of processing items to be displayed for the user determined as belonging to the first group.

16 Claims, 11 Drawing Sheets

| DISPLAY OBJECT | SELECTION FREQUENCY (TIMES/MONTH) |
|---|---|
| ICON 6 0 1 | 176 |
| ICON 6 0 3 | 115 |
| ICON 6 0 5 | 70 |

FIG.6

| DISPLAY OBJECT | SELECTION FREQUENCY (TIMES/MONTH) |
|---|---|
| ICON 6 0 1 | 230 |
| ICON 6 0 2 | 120 |
| ICON 6 0 3 | 68 |
| ICON 6 0 4 | 44 |
| ICON 6 0 5 | 37 |
| ICON 6 0 6 | 15 |
| ICON 6 0 7 | 7 |

| DISPLAY OBJECT | SELECTION FREQUENCY (TIMES/MONTH) |
|---|---|
| ICON 6 0 7 | 180 |
| ICON 6 0 4 | 110 |
| ICON 6 0 3 | 57 |
| ICON 6 0 2 | 52 |
| ICON 6 0 6 | 41 |
| ICON 6 0 5 | 17 |
| ICON 6 0 1 | 9 |

FIG.10

DISPLAY CONTROL DEVICE, IMAGE PROCESSING DEVICE AND DISPLAY CONTROL METHOD

BACKGROUND OF THE INVENTION

1. Field of the Invention

The present invention relates to an interface screen which displays objects to be displayed such as characters or icons, and particularly relates to a display control technique for displaying objects to be displayed, on an interface screen.

2. Description of the Related Art

When selecting among processing modes (copy processing mode, print processing mode, etc.) for performing respectively different processings in a commonly used image processing device or the like, an icon corresponding to a desired processing mode is selected from a main menu screen. This main menu screen displays the same content regardless of whether the user is a registered user of the image processing device or the like or one of many unspecified users other than registered users (see, for example, Jpn. Pat. Appln. Laid-Open Publications Nos. 2004-348085, 2004-185143, 2000-231309, and 11-288344).

However, some processing modes selected by an user give rise to a risk that guest users can be allowed to acquire information which should not be open to outside. On the other hand, being too sensitive to setting of a higher security level may undesirably impair operatability of the interface screen displayed for registered users.

SUMMARY OF THE INVENTION

An embodiment of the present invention has been achieved to address the aforementioned problems and has an object of providing a technique capable of improving operatability for registered users and capable of displaying an interface screen for guest users with security levels maintained.

According to one aspect of the invention to address the above problems, there is provided a display control device including: an identification information obtaining unit that obtains identification information for identifying a user; a determination unit that determines, based on the identification information obtained by the identification information obtaining unit, whether the user belongs to a first group or a second group which is allowed to conduct operation concerning only processing items of a lower security level than a security level allowed for the first group; and a control unit that performs control so as to display, for the user determined as belonging to the second group by the determination unit, display objects corresponding to predetermined processing items of a lower security level than a security level of processing items to be displayed for the user determined as belonging to the first group.

According to another aspect of the invention, there is provided an image processing device including: the display control device configured as described above; an operation input unit that receives operation input from a user, based on content displayed by the display control device; and an image processing unit that performs predetermined image processing, based on the input received by the operation input unit.

According to still another aspect of the invention, there is provided a display control method including: obtaining identification information for identifying a user; determining, based on the obtained identification information, whether the user belongs to a first group or a second group which is allowed to conduct operation concerning only processing items of a lower security level than a security level allowed for the first group; and performing control so as to display, for the user determined as belonging to the second group, display objects corresponding to predetermined processing items of a lower security level than a security level of processing items to be displayed for the user determined as belonging to the first group.

According to still another aspect of the invention, there is provided a display control device including: an identification information obtaining means for obtaining identification information for identifying a user; a determination means for determining, based on the identification information obtained by the identification information obtaining means, whether the user belongs to a first group or a second group which is allowed to conduct operation concerning only processing items of a lower security level than a security level allowed for the first group; and a control means for performing control so as to display, for the user determined as belonging to the second group by the determination means, display objects corresponding to predetermined processing items of a lower security level than a security level of processing items to be displayed for the user determined as belonging to the first group.

DESCRIPTION OF THE EMBODIMENT

Figure 1:
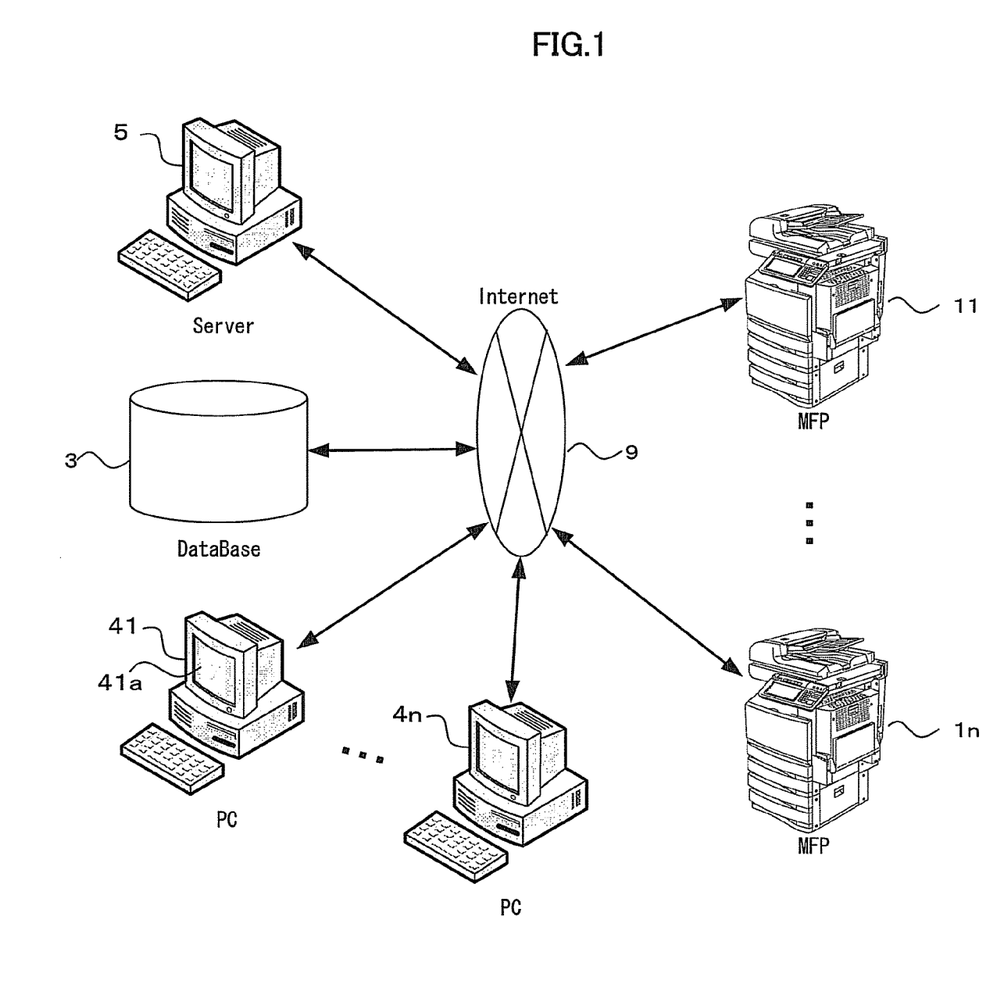
FIG. 1 shows a configuration of a network system to which an image processing device 11 having a display control device 2 according to an embodiment is applied.

An embodiment of the present invention will now be described with reference to the drawings. FIG. 1 shows a configuration of a network system to which an image processing device 11 having a display control device 2 according to the embodiment is applied. In the network system shown in the figure, image processing devices 11 to 1*n*, a database 3, PCs (Personal Computers) 41 to 4*n*, and a server 5 are connected to be able to communicate mutually via an electric communication channel such as the Internet 9.

In this configuration, it is supposed that the Internet is the means which connects the image processing devices 11 to 1*n*, database 3, PCs 41 to 4*n*, and server 5 to be able to communicate with one another. However, the means is not limited to the Internet but can be a LAN, WAN, or the like (whether the means is of a wired type or wireless type). From the PCs 41 to 4*n*, various settings concerning image processing can be carried out and execution commands for image processing can be issued to the image processing devices 11 to 1*n*. Commands and the like from the PCs 41 to 4*n* to the image processing devices 11 to 1*n* are issued by a driver installed in the PCs 41 to 4*n*. The database 3 functions as a storage area for storing various setting information or the like which is used by the image processing devices 11 to 1*n* and PCs 41 to 4*n*.

Figure 2:
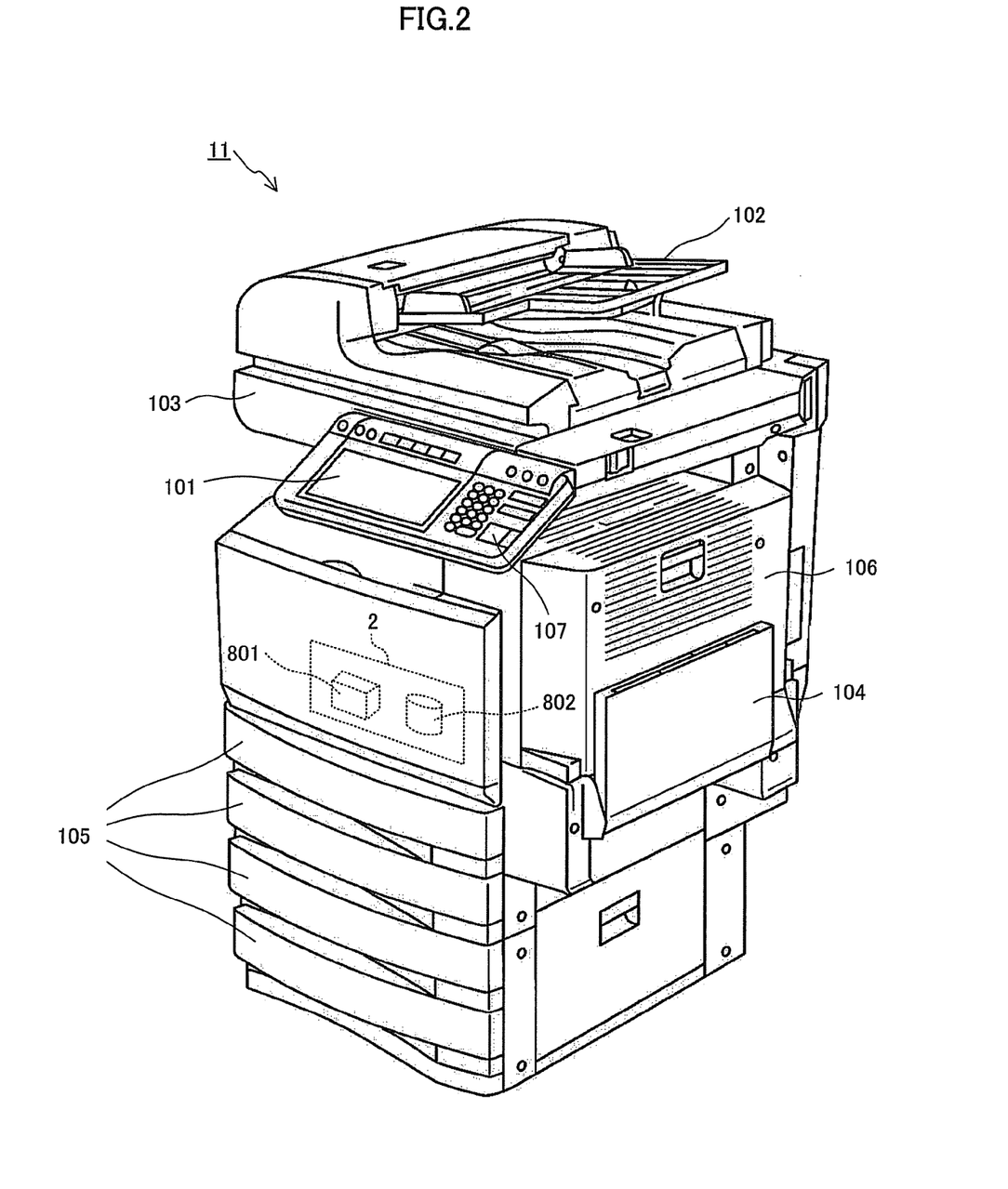
FIG. 2 is a perspective view for describing outline of the image processing device 11, showing an outer appearance of the image processing device 11 which has the display control device 2 according to the embodiment.

FIG. 2 is a perspective view for describing outline of the image processing device 11, showing an outer appearance of the image processing device 11 which has the display control device 2 according to the embodiment. In this case, for example, an MFP (Multi Function Peripheral) is dealt with as the image processing device 11.

The image processing device 11 according to the embodiment is constituted by an interface screen 101, ADF (Auto Document Feeder) 102, image reader unit (image reader means) 103, manual sheet feed unit (manual sheet feed means) 104, sheet feed cassette 105, image forming unit (image forming means) 106, authentication processing unit (authentication processing means) 107, and display control device 2.

Operation of the image processing device 11 according to the embodiment will now be described in brief. In case of carrying out a copy processing (a predetermined image processing) by the image processing device 11, a user authentication processing is performed at first by the authentication processing unit 107. Subsequently, an original material set on the ADF 102 is automatically conveyed to a document read position of the image reader unit (image processing unit) 103, based on operation input by a user who has succeeded in the authentication processing. An image is read from the original material conveyed in this manner. Further, according to a sheet feed method selected based on operation input through the interface screen 101, sheet feed operation is carried out by either the sheet feed cassette 105 or the manual sheet feed unit 104. A fed paper sheet is conveyed to the image forming unit (image processing unit) 106 and is subjected to an image forming processing based on the image read by the image reader unit 103. Thus, the copy processing is completed.

The interface screen 101 is constituted by, for example, a touch panel display and functions as an operation input unit which receives operation input from the user, based on content displayed on the interface screen 101.

Details of the display control device 2 will now be described. The display control device 2 functions to display, on the interface screen 101, plural display objects such as characters or icons corresponding to plural processing modes which respectively perform different predetermined processing, such as "Send Data", "Call Content of Registered Favorites", "Scan Preview", "Print", "Save Data", and "Box". The "characters" include "symbols" and "icons" include "figures". In the display control device according to this embodiment, either characters or icons can be displayed as display objects on the screen. For convenience sake, display objects will be simply referred to as "icons" in the following description. A target to be processed through the predetermined processing by the image processing device 11 is, for example, an original material of a sheet type or a brochure type or image data.

Figure 3:
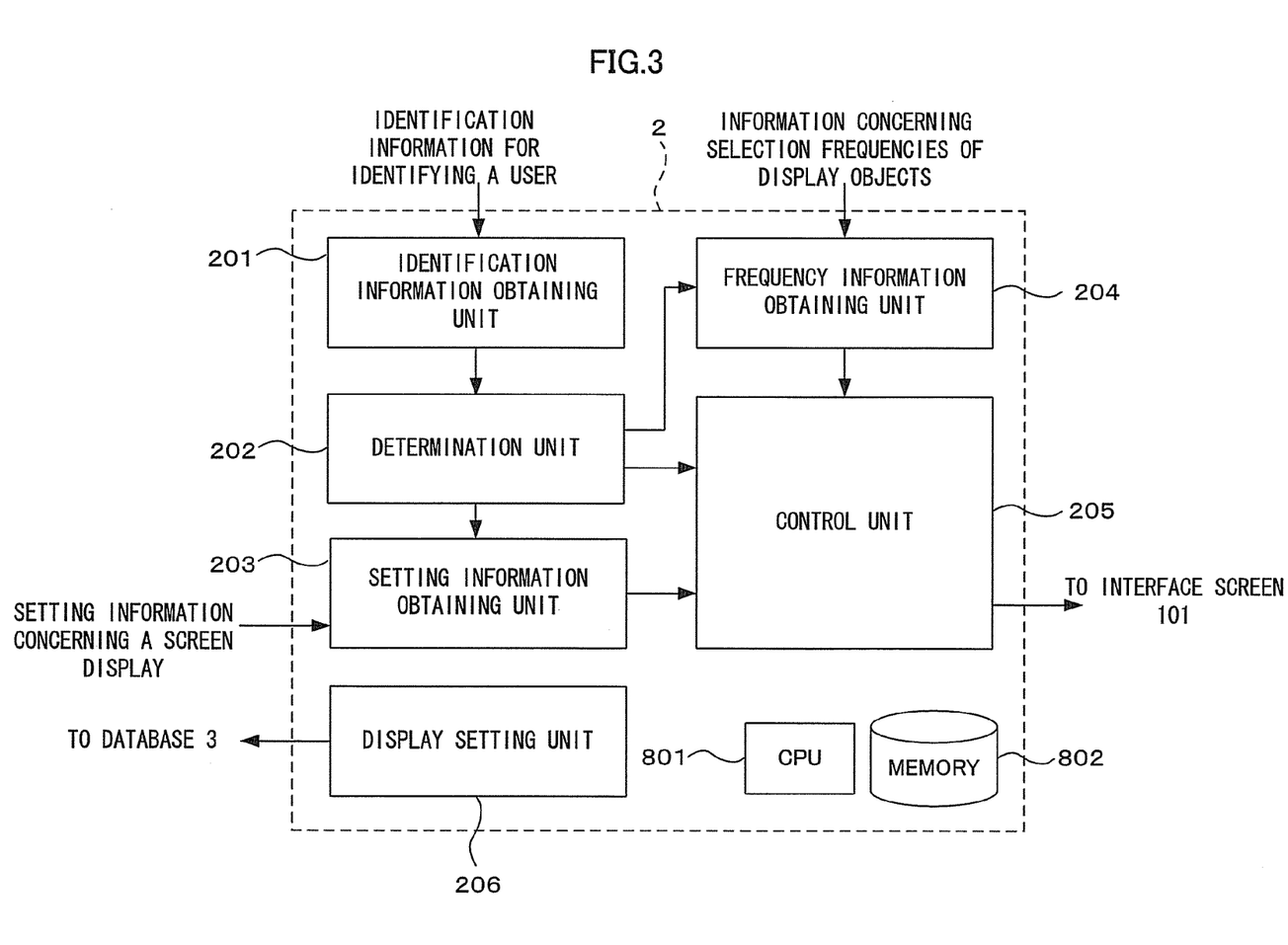
FIG. 3 is a functional block diagram for describing the display control device 2 according to the embodiment.

FIG. 3 is a functional block diagram for describing the display control device 2 according to the embodiment. The display control device 2 according to this embodiment is constituted by an identification information obtaining unit (identification information obtaining means) 201, a determination unit (determination means) 202, a setting information obtaining unit (setting information obtaining means) 203, a frequency information obtaining unit (frequency information obtaining means) 204, a control unit (control means) 205, a display setting unit (display setting means) 206, a CPU 801, and a MEMORY 802.

The authentication information obtaining unit 201 obtains identification information such as a user ID for identifying a user, which is obtained through authentication processing by the authentication processing unit 107. The authentication processing by the authentication processing unit 107 is achieved by reading a user ID recorded in a contactless IC card owned by a user via an antenna which the authentication processing unit 10 has. Needless to say, the method in which the authentication processing unit 107 obtains identification information is not limited to reading from a contactless IC card. For example, identification information can by obtained upon key input or input of biometric information such as a fingerprint or voiceprint based on biometric authentication.

Based on the identification information obtained by the identification information obtaining unit 201, the determination unit 202 determines which of a "first group" and a "second group which is allowed to operate only processing items of a lower security level than the first group" the user belongs to. Users who belong to the first group have been registered in advance. Users who belong to the second group are guest users not registered.

The setting information obtaining unit 203 obtains setting information related to the identification information of the user who has been determined to belong to the first group, from the database 3 as an external device which can communicate with the display control device 2.

The frequency information obtaining unit 204 obtains from the database 3 information concerning frequency of selecting display objects in the image processing device 11 having the display unit (equivalent the interface screen 101) to be displayed on the screen by the control unit 205, with respect to the user determined to belong to the first group by the determination unit 202.

Figure 4:
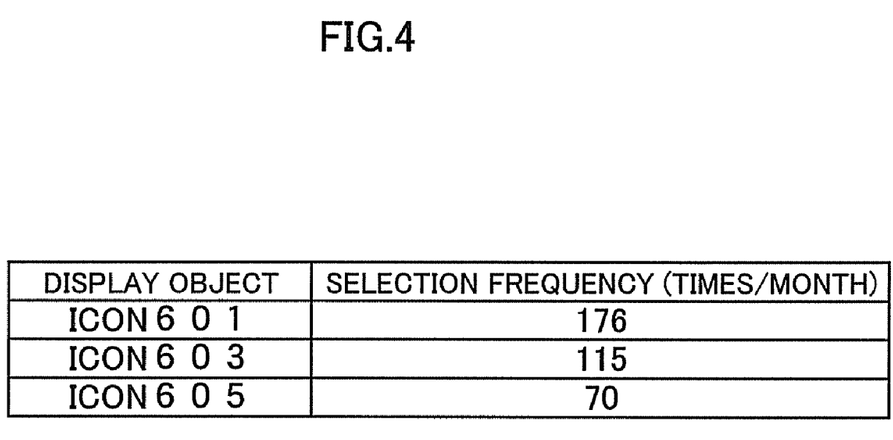
FIG. 4 is a table listing icons (display objects corresponding to predetermined processing items) which are allowed to be displayed on a screen to guest users who belong to a second group.
Figure 5:
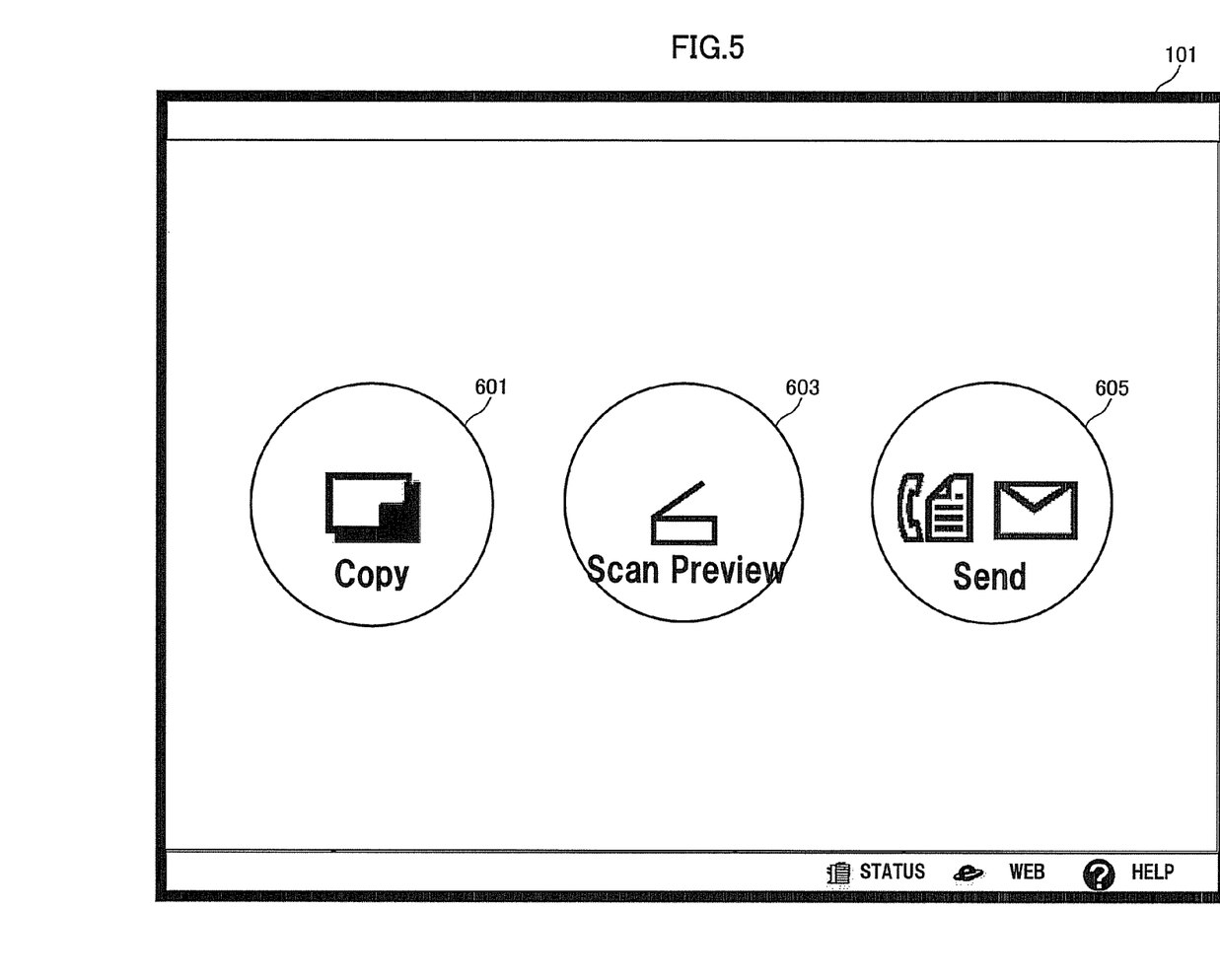
FIG. 5 shows an example of an interface screen displayed by a control unit 205 for guest users who belong to the second group.

For a user who is determined as belonging to the second group by the determination unit 202, the control unit 205 displays only display objects corresponding to predetermined processing items having a lower security level than a security level of processing items to be displayed for a user who is determined as belong to the first group. FIG. 4 is a table listing icons (display objects corresponding to predetermined processing items) which are allowed to be displayed on a screen to guest users who belong to the second group. Selection frequency in this table refers to an average value of selection frequency per month with respect to all users who use the image processing device 11. FIG. 5 shows an example of an interface screen displayed by the control unit 205 for guest users who belong to the second group.

In the example shown in the figure, icons 601, 603, and 605 corresponding to respective processing modes are displayed in equal sizes, arranged in line. As a security measure against guest users, "Save Data", "Box", "Favorite", and "Print" are excluded in advance from display objects.

Thus, to users determined as belonging to the second group, the control unit 205 prevents display of display objects corresponding to processing items which enable access to information which is allowed to be accessed from only users determined as belonging to the first group.

On the other side, to users determined as belonging to the first group, the control unit 205 allows display of display objects corresponding to processing items which enable access to information which is allowed to be accessed from only users determined as belonging to the first group, on the basis of setting information obtained by the setting information obtaining unit 203. In this case, icons corresponding to all processing modes "Send Data", "Call Content of Registered Favorites", "Scan Preview", "Print", "Save Data", and "Box" can be displayed.

Figure 6:
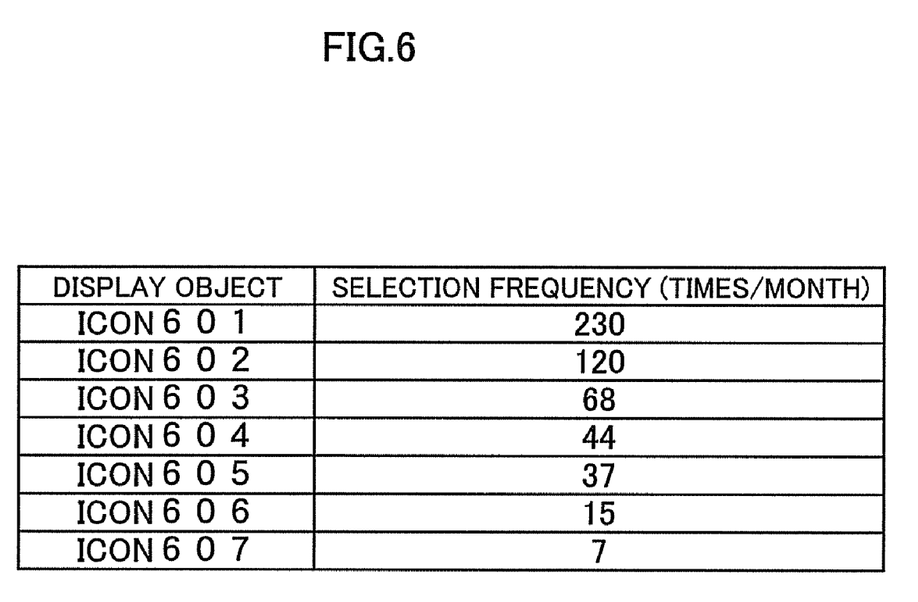
FIG. 6 is a table which is obtained by a frequency information obtaining unit 204 and shows selection frequencies of display objects selected by a user.
Figure 7:
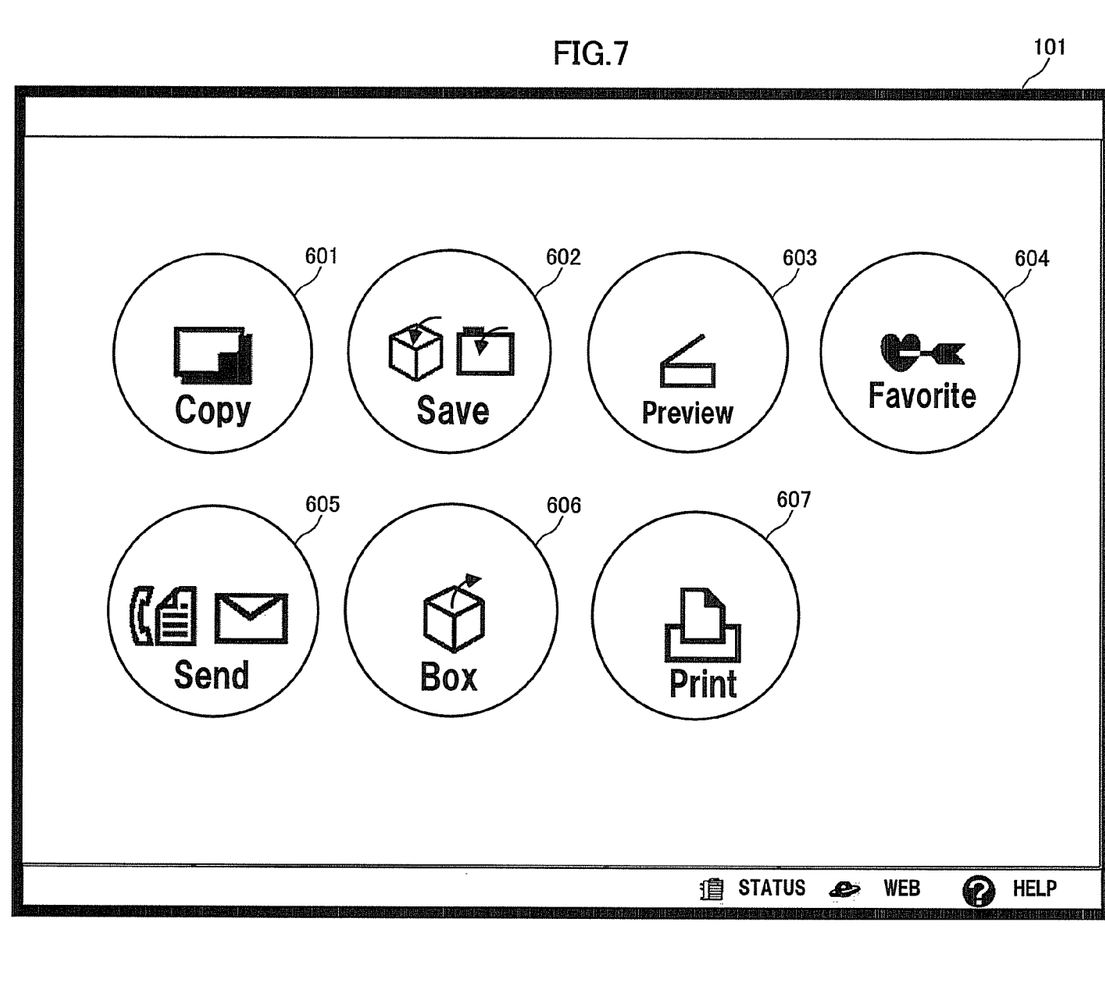
FIG. 7 shows a state in which icons 601 to 607 are arranged such that an icon having the highest selection frequency is positioned at an upper left part of the screen and an icon having the lowest selection frequency is positioned at a lower right part of the screen, based on selection frequencies obtained by the frequency information obtaining unit.

Based on information obtained by the frequency information obtaining unit 204, the control unit 205 controls display objects to be displayed such that display objects are arrayed from one of the left and upper sides on the screen in order from one selected at the highest frequency by the user. FIG. 6 is a table which is obtained by the frequency information obtaining unit 204 and shows selection frequencies of display objects selected by a user. As can be seen from the table, the icons 601, 602, 603, 604, 605, 606, and 607 are ranked in this order from one selected at the highest selection frequency. FIG. 7 shows a state in which the icons 601 to 607 are arranged such that an icon having the highest selection frequency is positioned at an upper left part of the screen and an icon having the lowest selection frequency is positioned at a lower right part of the screen, based on selection frequencies obtained by the frequency information obtaining unit 204. There is a commonly used principle that, when designing a user interface, the most important object is located in the left side or upper side while the least important object is located in the right side or lower side. Desirably, icons should be arranged on the screen according to this principle. That is, if the entire display area is located deviated to the left side, upper side, or upper left side, icons of higher importance are naturally located deviated to the left side, upper side, or upper left side from the center position on the screen. Then, icons of lower importance located in an outer annular area are positioned deviated to the right side, lower side, or lower right side from the center position on the screen. In this manner, icons can be arrayed according to a commonly used design principle (which users feel natural), contributing to improvement of operatability for users.

Figure 8:
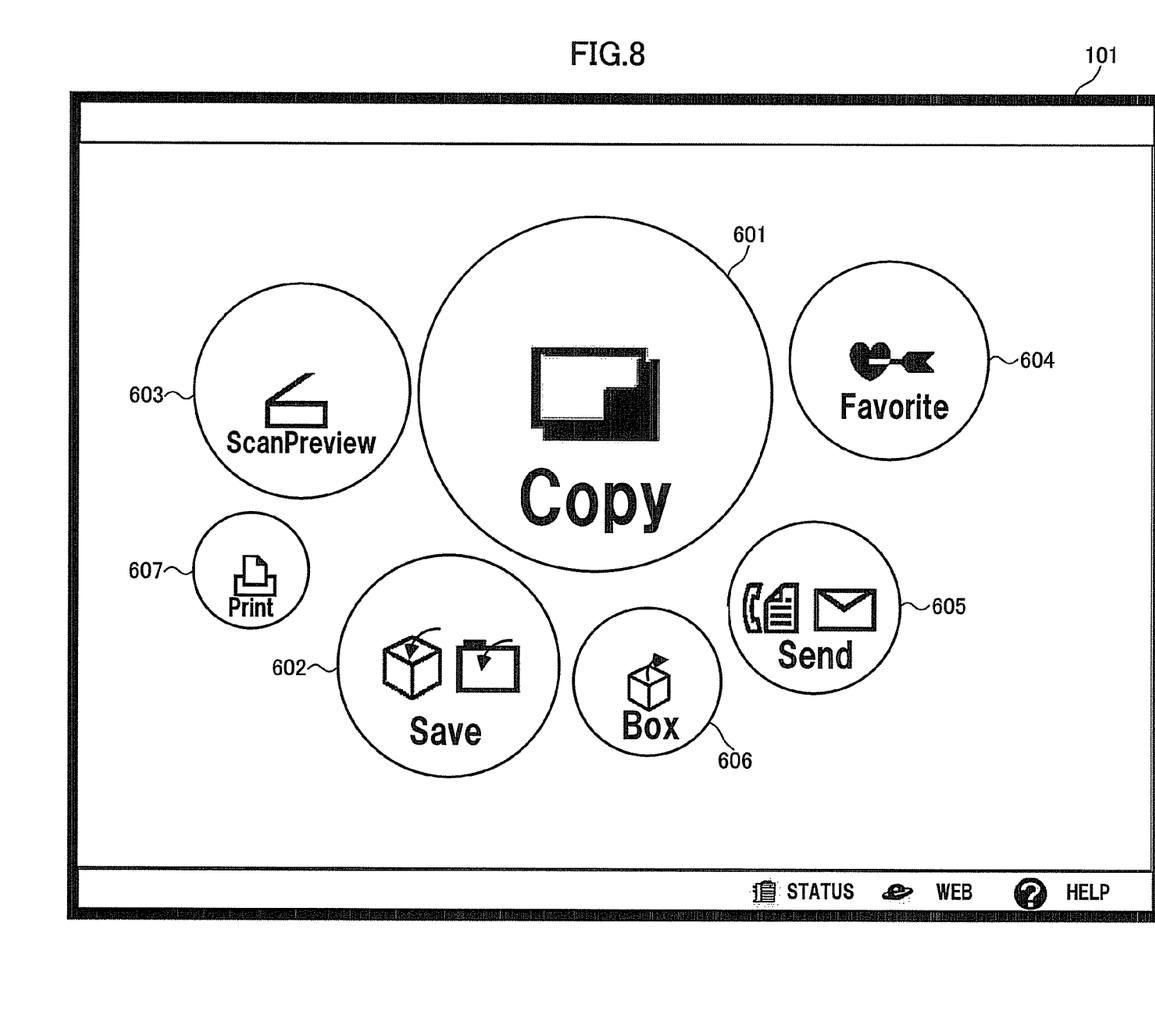
FIG. 8 shows an example of an interface screen 101 in which icons are displayed (emphasized) by the control unit such that the higher the selection frequency, the greater the size.

Based on information obtained by the frequency information obtaining unit 204, the control unit 205 can further display objects such that the higher the selection frequencies at which the display objects are selected by the user are, the more the display objects are emphasized on the screen. More specifically, the control unit 205 achieves emphasized display of display objects, for example, by changing at lest one of content of characters, font of characters, line weight of characters, inclination of characters, shape of a figure, thickness of lines, brightness, size, motion, saturation, and contrast value. FIG. 8 shows an example of the interface screen 101 in which icons are displayed (emphasized) by the control unit 205 such that the higher the selection frequency, the greater the size.

Thus, in case where a registered user logs in, icons having a higher selection frequency are displayed emphasized or located at conspicuous positions which easily attract the user in accordance with a common design principle concerning a user interface, on the basis of a past operation log of the user. As a result, the interface screen can be arranged so that icons which will be selected more frequently by the user are easier to select, contributing to improvement of operatability.

Thus, a group of icons which are allowed to be displayed to users who belong to the first group are displayed to the users, on the screen, based on display settings respectively corresponding to the users. To users who belong to the second group (so-called guests), a group of icons indicative of limited predetermined processing items for executing only operations which do not cause problems concerning security are displayed on the screen. In this manner, operatability for registered users can be improved, and an interface screen for guest users can be displayed with security levels maintained.

The display setting unit 206 further sets and registers, in the database 3, at least one of a display position or a degree of emphasis for an arbitrary display object on the screen. The setting information obtaining unit 203 obtains as setting information the information set by the display setting unit 206. That is, users are allowed to locate desired icons at desired display positions or to display desired icons emphasized at desired emphasis degrees. With this configuration, users are capable of customizing freely content displayed on the interface screen. Accordingly, each user can rearrange icons in order of use frequencies, and can inhibit display of icons corresponding to processing modes which the user does not use. Alternatively, menus having a close relationship with each other, such as "Scan Preview" and "Print" can be located, collected together. In this manner, an interface screen which is easy for each individual user to realize an operation content can be created. In addition, content of a setting concerning display positions or emphasized display of icons and the like is stored in an external device such as the database 3. Therefore, a user who once has made up a display setting can obtain the same display setting from the database 3 even when the user uses a different image processing device to display a main menu screen. Accordingly, even in such case, the user can carry out operation on a similar interface screen.

The CPU 801 functions to perform various processings in the image processing device 11 and display control device 2. The CPU 801 further functions to execute programs stored in the MEMORY 802 to achieve various functions. The MEMORY 802 is constituted by, for example, a ROM or RAM, and functions to store various information and programs used by the image processing device 11 and the display control device 2.

Figure 9:
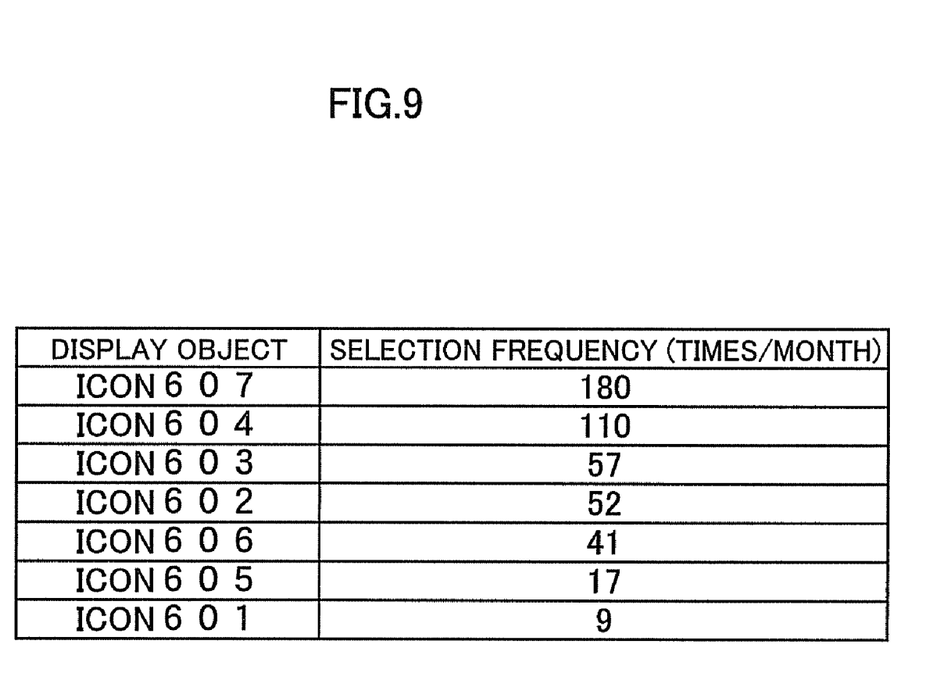
FIG. 9 is a table which is obtained by the frequency information obtaining unit 204 and shows selection frequencies of icons in a PC 41 with respect to a user who belongs to the first group.
Figure 10:
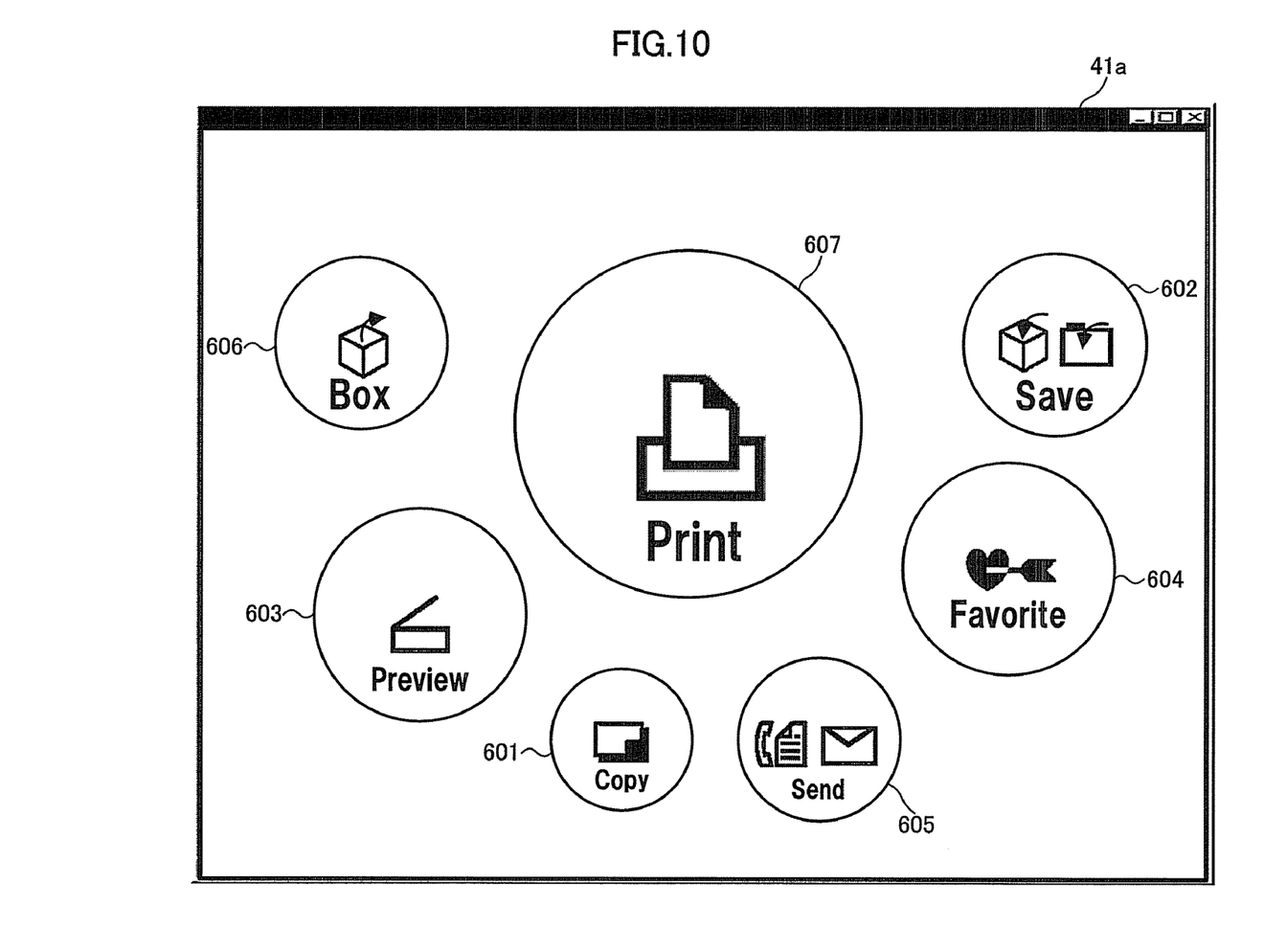
FIG. 10 shows an example of an interface screen displayed on a display screen 41a of the PC 41, based on the selection frequencies shown in FIG. 9.

The above embodiment refers to an example in which the interface screen 101 is included in the image processing device 11. The invention is not limited to this configuration but the interface screen 101 can be included in the PC 4. In this case, the frequency information obtaining unit 204 obtains, from the database 3, information concerning selection frequencies of display objects in the PC 41 with respect to a user who is determined as belonging to the first group by the determination unit 202. FIG. 9 is a table which is obtained by the frequency information obtaining unit 204 and shows selection frequencies of icons in the PC 41 with respect to a user who belongs to the first group (selection frequencies shown in FIG. 6 also relate to the same user). As can be seen from the table, the icons 607, 604, 603, 602, 606, 605, and 601 are selected by the user in this order from the highest selection frequency. This is because the user has different use purposes respectively for direct operation of the image processing device 11 and for remote operation through the PC 41. Thus, interface screens can be displayed respectively based on selection histories of devices which the user actually operates. Therefore, the user can work efficiently with the respective devices. FIG. 10 shows an example of an interface screen displayed on the display screen 41a of the PC 41, based on the selection frequencies shown in FIG. 9.

Figure 11:
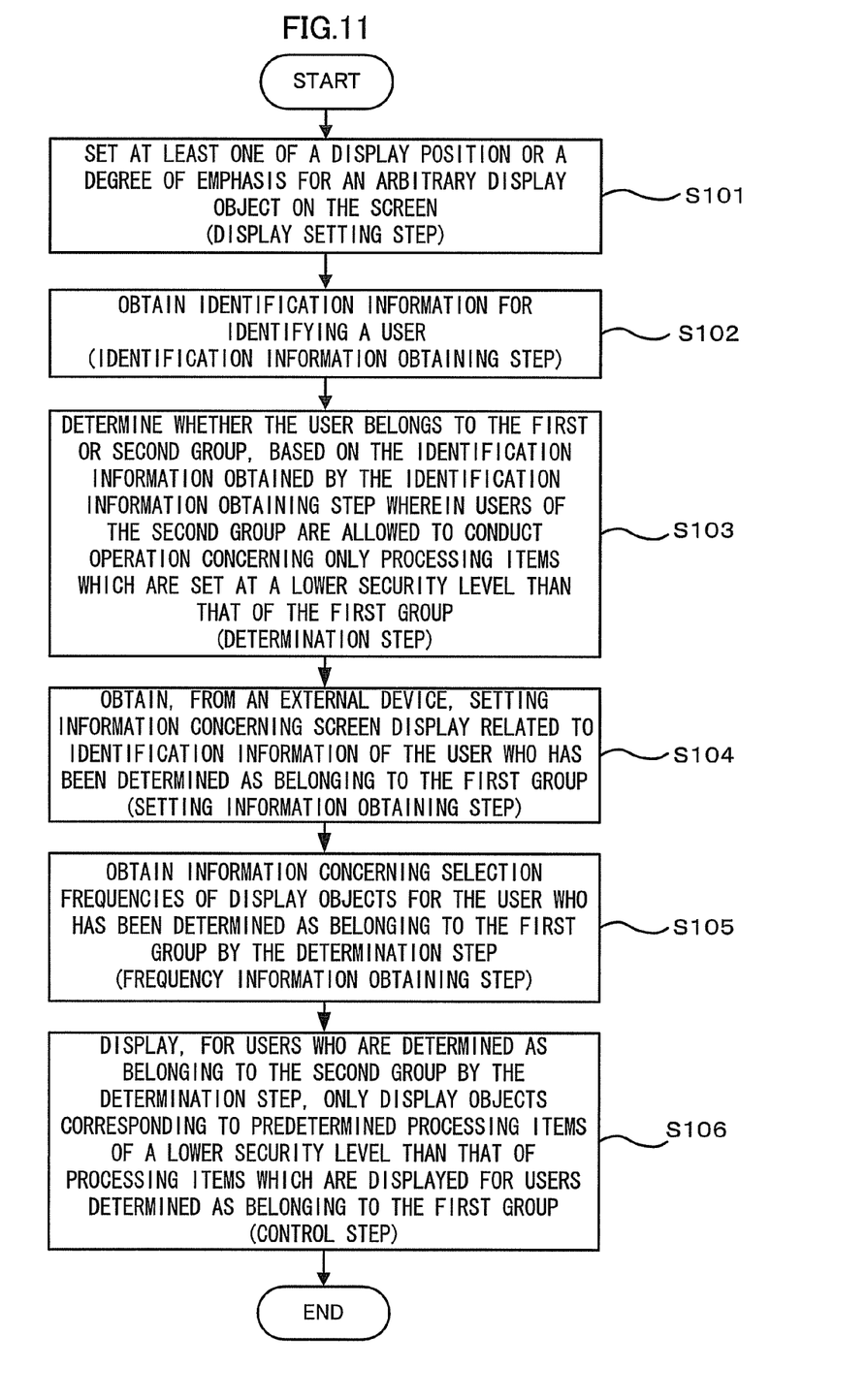
FIG. 11 is a flowchart for describing a flow of processing (display control method) in the display control device according the embodiment.

FIG. 11 is a flowchart for describing a flow of processing (display control method) in the display control device according this embodiment.

The display setting unit 206 sets at least one of a display position or a degree of emphasis for an arbitrary display object on the screen (display setting step: S101).

The identification information obtaining unit 201 obtains identification information for identifying a user (identification information obtaining step: S102).

The determination unit 202 determines whether the user belongs to the first or second group, based on the identification information obtained by the identification information obtaining unit (determination step: S103). Users of the second group are allowed to conduct operation concerning only processing items which are set at a lower security level than that of the first group.

The setting information obtaining step 203 obtains, from an external device, setting information concerning screen display related to identification information of the user who has been determined as belonging to the first group (setting information obtaining step: S104). In the setting information obtaining step, information set by the display setting step can be obtained as setting information.

The frequency information obtaining unit 204 obtains information concerning selection frequencies of display objects for the user who has been determined as belonging to the first group by the determination step (frequency information obtaining step: S105). The frequency information obtaining step should desirably obtain information concerning selection frequencies of display objects in a device on which a screen is to be displayed through a control step, with respect to the user who has been determined as belonging to the first group by the determination step.

By the control unit 205, only display objects corresponding to predetermined processing items of a lower security level than that of processing items which are displayed to users determined as belonging to the first group are displayed to users who are determined as belonging to the second group by the determination step (control step: S106). That is, to users determined as belonging to the second group, the control step inhibits display of display objects corresponding to processing items which enable access to information which is allowed to be accessible only from users determined as belonging to the first group. By the control step, display objects corresponding to processing items which should be displayed to users determined as belonging to the first group are displayed to users who are determined as belonging to the first group, based on setting information obtained by the setting information obtaining step.

In the control step, display objects should desirably displayed such that display objects are arrayed from one of the left and upper sides on the screen in order from a display object selected at the highest selection frequency by a user, based on information obtained by the frequency information obtaining step. Alternatively, display objects can be displayed such that the higher the selection frequencies at which the display objects are selected by a user are, the more the display objects are emphasized on the screen.

Each of the steps of the processing in the above display control device can be performed by causing the CPU 801 to execute a display control program stored in the MEMORY 802. The embodiment is configured such that the display setting step is executed first. However, the invention is not particularly limited to this configuration as far as content of a setting set by the display setting step can be referred to when processing for displaying an interface screen is performed in the control step. Needless to say, setting information which was set by the display setting unit 206 in a previous operation can be used in the control step being now newly executed.

The above embodiment has been described with reference to a case that functions which realize the invention have been recorded in a device. However, the invention is not limited to this case. For example, similar functions can be downloaded from a network or a recording medium storing similar functions can be installed in a device. The recording medium can be of any type such as CD-ROM or the like as far as the recording medium can store a program and is readable from a device. Such functions which can be obtained by installation or download cooperate with an OS (Operating System) inside a device, to realize the functions.

Although the above embodiment refers to an example in which various setting information is obtained from a database 3 by an image processing device or PC, the invention is not limited to this example. For example, the setting information can be obtained from a storage area (MEMORY 802 or the like) included in a device on which an icons screen is to be displayed according to the display control method as described above, or can be obtained from another image processing device or PC.

The above embodiment refers to an example in which a main menu screen is displayed on a MFP or PC. Needless to say, however, the invention is applicable to any device such as a printer, scanner, and MMK (Multi Media Kiosk) in addition to a MFP and PC as far as the device performs predetermined image processing such as image forming processing, image reading processing, image edit processing, and/or image pickup processing.

The invention has been described with reference to a particular embodiment as described above. However, it would be obvious for a person skilled in the art that various changes and modifications are available without deviating from the sprit and scope of the invention.

As has been specifically described above, according to the invention, there is provided a technique capable of improving operatability for registered users and of displaying an interface screen for guest users with security levels maintained.

What is claimed is:

1. A display control device comprising:
an identification information obtaining unit that obtains identification information for identifying a user;
a determination unit that determines, based on the identification information obtained by the identification information obtaining unit, whether the user belongs to a first group or a second group which is allowed to conduct operation concerning only processing items of a lower security level than a security level allowed for the first group;
a storage unit that stores information concerning selection frequencies of display objects selected by the user on each device having a display unit to be controlled so as to display the display objects, the user being determined as belonging to the first group by the determination unit;
a frequency information obtaining unit that obtains the information concerning selection frequencies of display objects; and
a control unit that performs control so as to display, for the user determined as belonging to the second group by the determination unit, display objects corresponding to predetermined processing items of a lower security level than a security level of processing items to be displayed for the user determined as belonging to the first group, and performs control so as to display the display objects such that the higher the selection frequencies at which the display objects are selected by the user are, the more the display objects are emphasized, based on the information obtained by the frequency information obtaining unit.

2. The display control device according to claim 1, wherein for the user determined as belonging to the second group, the control unit inhibits display of display objects corresponding to processing items which are allowed to be accessible only from the user determined as belonging to the first group.

3. The display control device according to claim 1, further comprising a setting information obtaining unit that obtains setting information concerning screen display from an external device capable of communicating with the display control device, the setting information being related to the identification information of the user determined as belonging to the first group by the determination unit, wherein
for the user determined as belonging to the first group, the control unit performs control so as to display objects corresponding to processing items to be displayed for the user determined as belonging to the first group, on the basis of the setting information obtained by the setting information obtaining unit.

4. The display control device according to claim 3, further comprising a display setting unit that sets at least one of a display position and a degree of emphasis of an arbitrary display object on a screen, wherein
the setting information obtaining unit obtains, as the setting information, information set by the display setting unit.

5. The display control device according to claim 1, further comprising a frequency information obtaining unit that obtains information concerning selection frequencies at which display objects have been selected by the user determined as belonging to the first group by the determination unit, wherein
based on the information obtained by the frequency information obtaining unit, the control unit performs control so as to display the display objects such that display objects are arrayed from at least one of left and upper sides on a screen in order from a display object selected at the highest selection frequency by the user.

6. The display control device according to claim 1, wherein the display objects include at least one of texts and icons.

7. The display control device according to claim 1, wherein the control unit performs control so as to display the display objects emphasized by changing any of content of a text, font of a text, thickness of a text, inclination of a text, shape of a figure, thickness of a line, brightness, size, motion, saturation, and a contrast value.

8. An image processing device comprising:
the display control device according to claim 1; an operation input unit that receives operation input from a user, based on content displayed by the display control device; and
an image processing unit that performs predetermined image processing, based on the input received by the operation input unit.

9. A display control method comprising:
obtaining identification information for identifying a user;
determining, based on the obtained identification information, whether the user belongs to a first group or a second group which is allowed to conduct operation concerning only processing items of a lower security level than a security level allowed for the first group;
obtaining information concerning selection frequencies of display objects;
storing information concerning selection frequencies of display objects selected by the user on each device having a display unit to be controlled so as to display the display objects, the user being determined as belonging to the first group; and
performing control so as to display, for the user determined as belonging to the second group, display objects corresponding to predetermined processing items of a lower security level than a security level of processing items to be displayed for the user determined as belonging to the first group, and performing control so as to display the display objects such that the higher the selection frequencies at which the display objects are selected by the user are, the more the display objects are emphasized, based on the information concerning selection frequencies of display objects.

10. The display control method according to claim 9, wherein
the control is performed so as to inhibit, for the user determined as belonging to the second group, display of objects corresponding to processing items which are allowed to be accessible only from the user determined as belonging to the first group.

11. The display control method according to claim 9, further comprising obtaining, from an external device, setting information concerning screen display related to the identification information of the user determined as belonging to the first group, wherein
the control is performed so as to display, for the user determined as belonging to the first group, display objects corresponding to processing items to be displayed for the user determined as belonging to the first group, on the basis of the obtained setting information.

12. The display control method according to claim 11, further comprising setting at least one of a display position and a degree of emphasis of an arbitrary display object on a screen, wherein
in obtaining the setting information, the at least set one of the display position and the degree of emphasis is obtained as the setting information.

13. The display control method according to claim 9, further comprising obtaining information concerning selection frequencies at which display objects have been selected by the user determined as belonging to the first group, wherein
the control is performed so as to display the display objects such that display objects are arrayed from at least one of left and upper sides on a screen in order from a display object selected at the highest selection frequency by the user, based on the information obtained.

14. The display control method according to claim 9, wherein the display objects include at least one of texts and icons.

15. The display control method according to claim 9, wherein the control is performed so as to display the display objects emphasized by changing any of content of a text, font of a text, thickness of a text, inclination of a text, shape of a figure, thickness of a line, brightness, size, motion, saturation, and a contrast value.

16. A display control device comprising:
identification information obtaining means for obtaining identification information for identifying a user;
determination means for determining, based on the identification information obtained by the identification information obtaining means, whether the user belongs to a first group or a second group which is allowed to conduct operation concerning only processing items of a lower security level than a security level allowed for the first group;

storage means for storing information concerning selection frequencies of display objects selected by the user on each device having a display unit to be controlled so as to display the display objects, the user being determined as belonging to the first group by the determination means;

frequency information obtaining means for obtaining the information concerning selection frequencies of display objects; and control means for performing control so as to display, for the user determined as belonging to the second group by the determination means, display objects corresponding to predetermined processing items of a lower security level than a security level of processing items to be displayed for the user determined as belonging to the first group, and for performing control so as to display the display objects such that the higher the selection frequencies at which the display objects are selected by the user are, the more the display objects are emphasized, based on the information obtained by the frequency information obtaining means.

* * * * *